United States Patent
Neighbor et al.

(10) Patent No.: US 12,473,997 B2
(45) Date of Patent: Nov. 18, 2025

(54) BREAKAWAY CABLE ATTACHMENT SYSTEMS

(71) Applicant: OSMOSE UTILITIES SERVICES, INC., Atlanta, GA (US)

(72) Inventors: Kristopher Mark Neighbor, Peachtree City, GA (US); Jeffrey R. Giffen, Peachtree City, GA (US); Donald Pitalo, Metairie, LA (US); Brian E. Reed, Eden, NY (US)

(73) Assignee: OSMOSE UTILITIES SERVICES, INC., Atlanta, GA (US)

( * ) Notice: Subject to any disclaimer, the term of this patent is extended or adjusted under 35 U.S.C. 154(b) by 30 days.

(21) Appl. No.: 18/207,205

(22) Filed: Jun. 8, 2023

(65) Prior Publication Data

US 2023/0400123 A1    Dec. 14, 2023

Related U.S. Application Data

(60) Provisional application No. 63/350,842, filed on Jun. 9, 2022.

(51) Int. Cl.
*F16L 3/10* (2006.01)
*F16B 31/02* (2006.01)

(52) U.S. Cl.
CPC .......... *F16L 3/1091* (2013.01); *F16B 31/021* (2013.01)

(58) Field of Classification Search
CPC ........ F16L 3/1091; F16L 3/1021; H02G 7/20; H02G 7/18; H02G 7/00
USPC ............. 248/74.1, 218.4–219.4, 49–74.5
See application file for complete search history.

(56) References Cited

U.S. PATENT DOCUMENTS

| 4,103,853 | A | * | 8/1978 | Bannan | H02B 5/02 248/230.5 |
| 4,195,192 | A |   | 3/1980 | Hackney et al. | |
| 4,570,884 | A | * | 2/1986 | Armbruster | F16L 3/22 248/68.1 |
| 4,698,717 | A |   | 10/1987 | Scheid | |
| 4,986,687 | A | * | 1/1991 | Ivey | H02G 7/00 403/2 |

(Continued)

OTHER PUBLICATIONS

International Search Report and Written Opinion dated Oct. 23, 2023 issued in PCT Application No. PCT/US23/24779.

*Primary Examiner* — Christopher Garft
(74) *Attorney, Agent, or Firm* — TROUTMAN PEPPER LOCKE LLP; James E. Schutz; Korbin M. Blunck (57) ABSTRACT

The disclosed technology includes a breakaway cable attachment system for attaching a cable to a utility pole. The breakaway cable attachment system can include a rail, a bracket, and a clamp. The rail can be attachable to a utility pole and have a base and two sidewalls extending outwardly from the base and forming a slot. The bracket can have an attachment portion and a mounting portion that extends at an angle away from the attachment portion. The mounting portion can be configured to extend at least partially into the slot of the rail for attachment to the rail. The clamp can be attachable to the attachment portion and receive and support a cable. The breakaway cable attachment system can be configured to prevent damage to the utility pole and/or the cable when a predetermined load is applied to the cable by detaching the cable from the utility pole.

18 Claims, 6 Drawing Sheets

(56) References Cited

U.S. PATENT DOCUMENTS

| | | | | |
|---|---|---|---|---|
| 5,799,918 A | * | 9/1998 | Swinderman | B65D 88/66 |
| | | | | 248/300 |
| 6,480,172 B1 | * | 11/2002 | Sawyer | H01Q 1/12 |
| | | | | 343/890 |
| 2010/0018014 A1 | * | 1/2010 | Boisclair | H02G 7/08 |
| | | | | 24/522 |
| 2016/0172834 A1 | * | 6/2016 | Fox | H02G 7/053 |
| | | | | 174/45 R |
| 2019/0011657 A1 | | 1/2019 | Baker et al. | |

* cited by examiner

BREAKAWAY CABLE ATTACHMENT SYSTEMS

This application claims the benefit of priority under 35 U.S.C. § 119 to prior filed U.S. Provisional Patent Application No. 63/350,842 filed on Jun. 9, 2022, the entire contents of which is hereby incorporated by reference as if set forth in full herein.

FIELD OF TECHNOLOGY

The disclosed technology relates generally to cable attachment systems and, more particularly, to breakaway cable attachment systems used for attaching cables to utility poles.

BACKGROUND

Utility cables (sometimes referred to as utility lines), including electrical and communication cables, are often attached to utility poles to run the cable between two locations. For example, internet companies often attach communication cables to utility poles to provide internet and entertainment services to their customers. To attach the utility cable to the utility pole, existing attachment systems typically utilize a clamp system that is bolted to the utility pole to securely clamp the utility cable to the utility pole. Because the cumulative weight of the utility cable can be substantial, some utility cables include a messenger cable that extends between utility poles and to which the utility cable is attached to provide additional support to the utility cable. No matter the configuration, existing clamp systems are designed to receive and support the messenger cable or the utility cable itself to ensure the weight of the messenger cable and/or the utility cable are sufficiently supported as each extends between utility poles.

Unfortunately, it is common for branches, trees, and other objects to fall on utility cables. As an object falls on a utility cable, the weight of the object is distributed to the attachment system and often either the utility pole is damaged, or the utility line and messenger cable are damaged. As will be appreciated, repairing or replacing a damaged utility pole and/or utility cable can be an expensive and time-consuming process.

What is needed, therefore, is a cable attachment system that is designed to reduce the likelihood that the utility cable or utility pole becomes damaged if an object falls on the utility cable. This and other problems are addressed by the technology disclosed herein.

SUMMARY

The disclosed technology can include a breakaway cable attachment system comprising a rail, a bracket, and a clamp. The rail can be configured for attachment to a utility pole. The rail can include a base and two sidewalls extending outwardly from the base forming a slot extending longitudinally along a length of the rail.

The bracket can have an attachment portion and a mounting portion extending at an angle away from the attachment portion. The mounting portion can be configured to extend at least partially into the slot of the rail for attachment to the rail.

The clamp can be configured for attachment to the attachment portion of the bracket and can receive and support a cable.

The breakaway cable attachment system can be configured to prevent damage to the utility pole and/or the cable when a predetermined load is applied to the cable by detaching the cable from the utility pole.

The rail can be attached to the utility pole by a shear bolt configured to break when the predetermined load is applied to the cable. Alternatively, or in addition, the bracket can be attached to the rail by a shear bolt configured to break when the predetermined load is applied to the cable. Alternatively, or in addition, the clamp can be attached to the bracket by a shear bolt configured to break when the predetermined load is applied to the cable.

The mounting portion of the bracket can extend at least partially around a bolt extending across the slot of the rail. The mounting portion can be configured to bend and/or fracture and detach from the rail when the predetermined load is applied to the cable.

A distance between the sidewalls of the rail can be greater distal the base than proximate the base.

The mounting portion of the bracket can be a first mounting portion and the bracket can further include a second mounting portion. A distance between the first mounting portion and the second mounting portion can be greater proximate the attachment portion than distal the attachment portion.

The clamp can include a spring that can be configured to deform when the predetermined load is applied to the cable such that the clamp can be opened to release the cable. The spring can be a spring-loaded washer.

The rail can be configured to be bolted to the utility pole. Alternatively, or in addition, the rail can include a slot that is configured to receive a strap or band. The breakaway cable attachment system can further include a strap or band that can extend through the slot of the rail to attach the breakaway cable attachment system to the utility pole.

Additional features, functionalities, and applications of the disclosed technology are discussed herein in more detail.

BRIEF DESCRIPTION OF THE DRAWINGS

The accompanying drawings, which are incorporated in and constitute a part of this specification, illustrate various aspects of the presently disclosed subject matter and serve to explain the principles of the presently disclosed subject matter. The drawings are not intended to limit the scope of the presently disclosed subject matter in any manner.

DETAILED DESCRIPTION

The disclosed technology includes a breakaway cable attachment system that can help prevent a cable and/or a utility pole from becoming damaged by detaching the cable from the utility pole if an object falls on the utility cable or the pole becomes fractured (e.g., a vehicle collides with the pole). For example, the breakaway cable attachment system can be configured to detach the cable from the utility pole to reduce the likelihood that the cable or utility pole will be damaged if a branch or tree falls on the cable. The breakaway cable attachment system can include a rail that can be attached to a utility pole, a bracket that can attach to the rail, and a clamp that can be attached to the bracket and configured to receive and support a cable. As will become apparent throughout this disclosure, the breakaway cable attachment system can be configured for easy installment onto a utility pole and can include several variations of configurations that can each enable the breakaway cable attachment system to detach the cable from the utility pole when a predetermined force is applied to the cable. In this way, the breakaway cable attachment system can help reduce the substantial time and cost associated with repairing or replacing utility poles and utility cables. Further configurations and advantages of the disclosed technology will become apparent throughout this disclosure.

Although various aspects of the disclosed technology are explained in detail herein, it is to be understood that other aspects of the disclosed technology are contemplated. Accordingly, it is not intended that the disclosed technology is limited in its scope to the details of construction and arrangement of components expressly set forth in the following description or illustrated in the drawings. The disclosed technology can be implemented and practiced or carried out in various ways. In particular, the presently disclosed subject matter is described in the context of being a breakaway attachment system for attaching utility cables to utility poles. The present disclosure, however, is not so limited, and can be applicable in other contexts such as breakaway cable attachment systems for attaching a cable (e.g., a cable, a rope, a line, a wire) to any support structure in which it is desirable for cable to detach from the support structure when a predetermined force is applied to the cable to help reduce damage to the cable and/or the support structure. Furthermore, the present disclosure can be applicable to attachment systems for attaching a cable to any support structure whether or not the system is designed to breakaway when a force is applied to the cable or the support structure. Further still, the present disclosure can be applicable to systems designed for supporting other objects such as signs and/or banners that are supported by a bracket and attached to a pole or other vertical component. Accordingly, when the present disclosure is described in the context of a breakaway attachment system for attaching utility cables to utility poles, it will be understood that other implementations can take the place of those referred to.

It should also be noted that, as used in the specification and the appended claims, the singular forms "a," "an," and "the" include plural references unless the context clearly dictates otherwise. References to a composition containing "a" constituent is intended to include other constituents in addition to the one named.

Also, in describing the disclosed technology, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, the disclosed technology can include from the one particular value and/or to the other particular value. Further, ranges described as being between a first value and a second value are inclusive of the first and second values. Likewise, ranges described as being from a first value and to a second value are inclusive of the first and second values.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

As used herein, the term "pole" includes various forms and definitions of elongated support members (e.g., utility poles, posts, pilings), whether or not constructed of wood.

As used herein, the terms "cable" and/or "utility line" can refer to various cables, lines, wire rope, and/or wires used to provide utilities such as electrical power, communication, signal or other utilities. Furthermore, the terms "cable" and/or "utility line" can include cables commonly used to reinforce utility lines such as messenger cables.

The components described hereinafter as making up various elements of the disclosed technology are intended to be illustrative and not restrictive. Many suitable components that would perform the same or similar functions as the components described herein are intended to be embraced within the scope of the disclosed technology. Such other components not described herein can include, but are not limited to, similar components that are developed after development of the presently disclosed subject matter.

Figure 1:
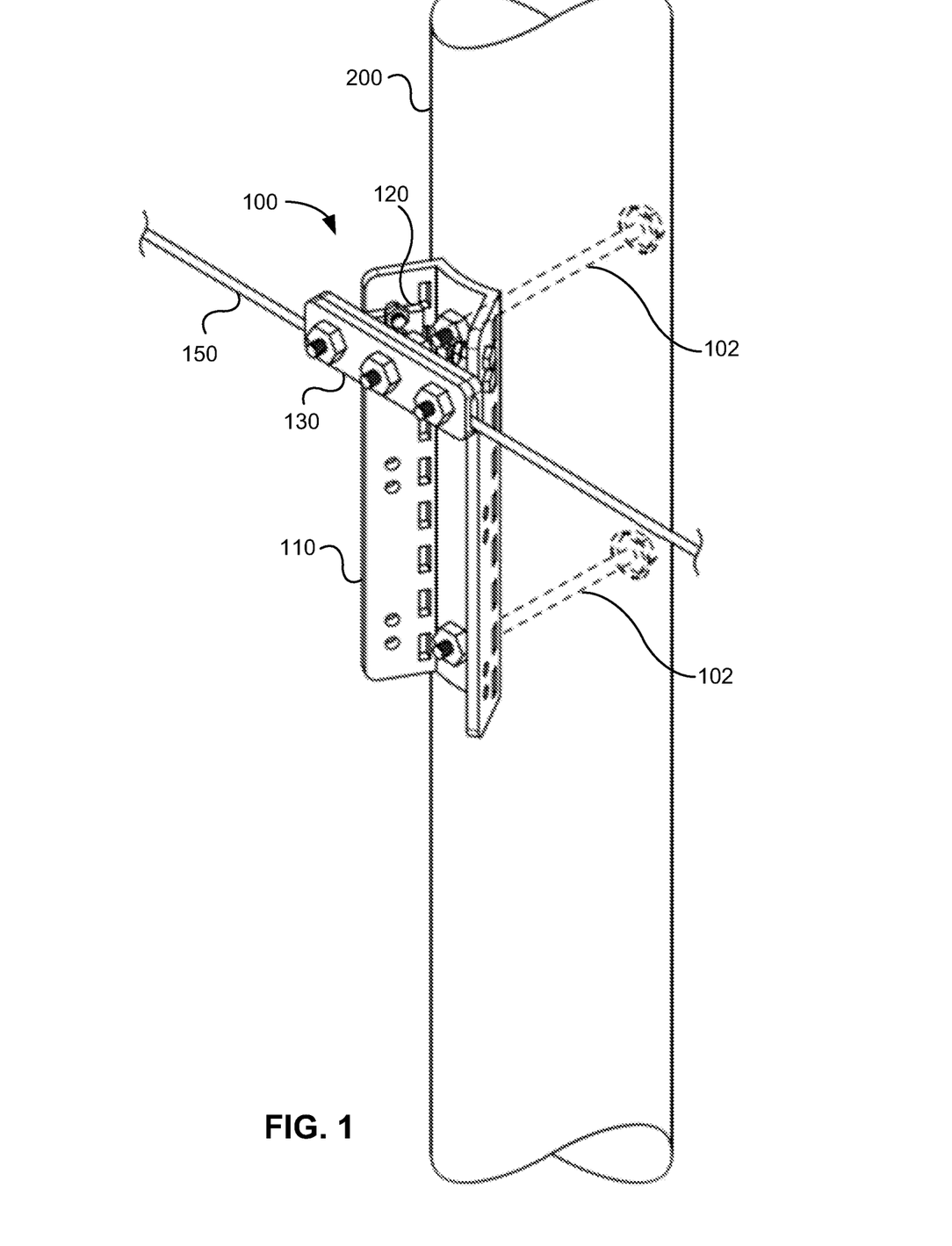
FIG. 1 illustrates a perspective view of a breakaway cable attachment system, in accordance with an example of the disclosed technology.

Referring now to the drawings, in which like numerals represent like elements, the present disclosure is herein described. FIG. 1 illustrates a perspective view of a breakaway cable attachment system 100, in accordance with an example of the disclosed technology. As shown, the breakaway cable attachment system 100 can be attached to a utility pole 200 and be configured to support a cable 150. For simplicity, only a portion of the utility pole 200 and the cable 150 are shown in FIG. 1. It will be appreciated, however, that the cable 150 can extend to adjacent utility poles 200 and/or junctions and that the utility pole 200 can extend vertically. Furthermore, although not shown, additional breakaway cable attachment systems 100 can be attached to the utility pole 200 as would be suitable for the particular configuration.

Figure 2A:
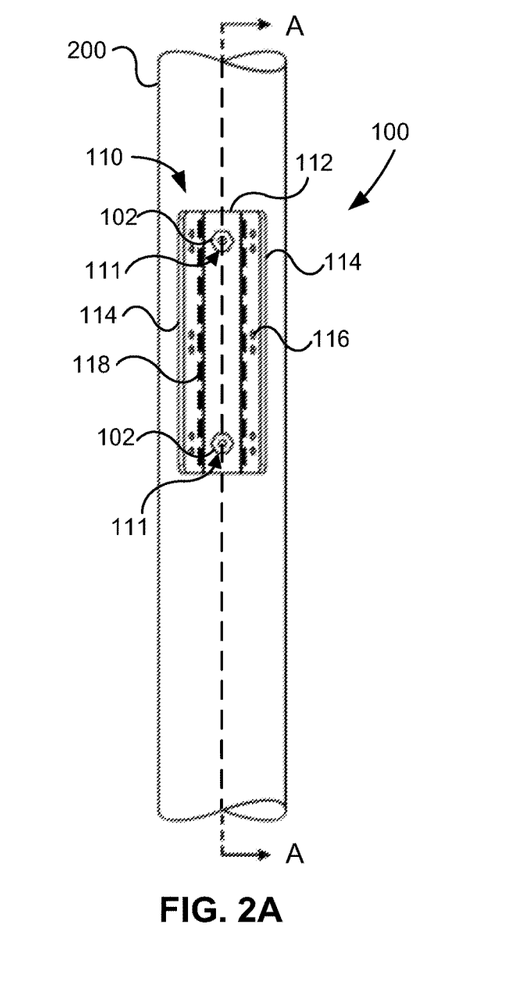
FIG. 2A illustrates a front view of a utility pole and rail of a breakaway cable attachment system, in accordance with an example of the disclosed technology.
Figure 2B:
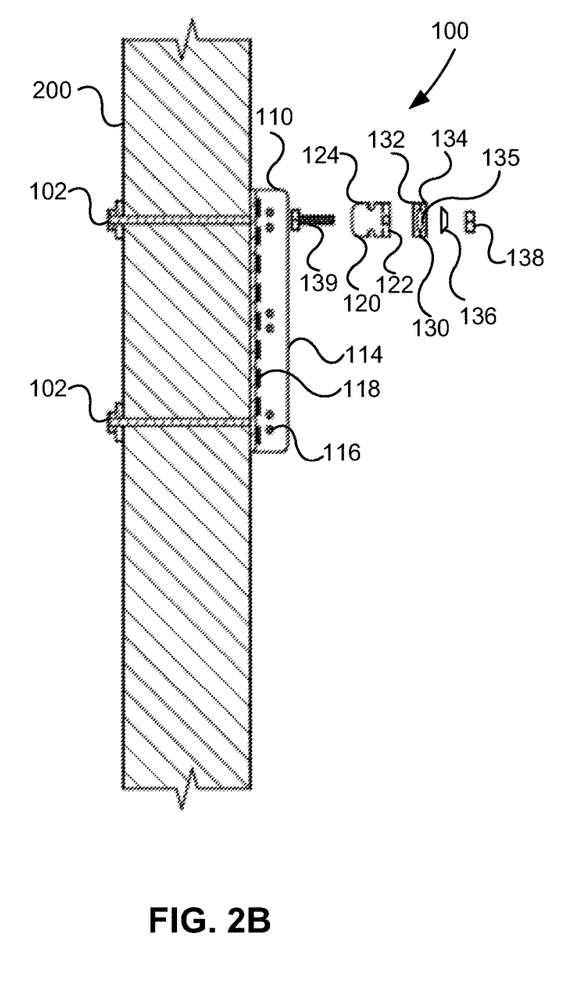
FIG. 2B illustrates a section view of a utility pole and rail taken along line A-A of FIG. 2A and other components of the breakaway cable attachment system shown in an exploded configuration, in accordance with an example of the disclosed technology.
Figure 2C:
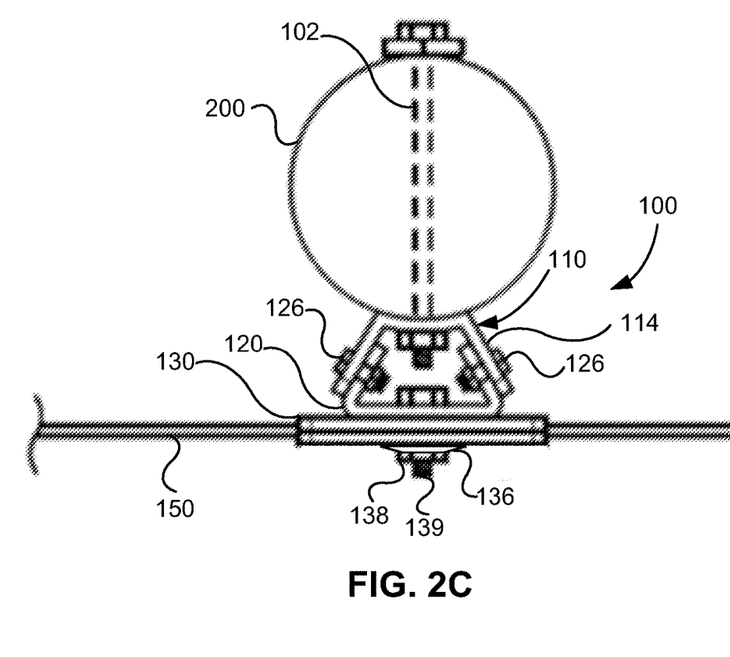
FIG. 2C illustrates a top view of a breakaway cable attachment system, in accordance with an example of the disclosed technology.

As illustrated in FIGS. 1-2C, the breakaway cable attachment system 100 can include a rail 110 that can be attached to the pole 200, a bracket 120 that can be attached to the rail 110, and a clamp 130 that can be attached to the bracket 120. As will become apparent throughout this disclosure, the breakaway cable attachment system 100 can be configured to detach the cable 150 from the pole 200 when a predetermined force is applied to the cable 150 (e.g., when a branch or tree falls on the cable 150). In this way, the breakaway cable attachment system 100 can help to prevent damage that can occur to the cable 150 and/or the pole 200 when an object falls on the cable 150. The predetermined force can be a force that is less than a force at which point the cable 150 and/or the pole 200 would be damaged (a threshold force). As a non-limiting example, if the cable 150 and/or the pole 200 would be damaged by a threshold force, the breakaway cable attachment system 100 can be configured to detach the cable 150 from the pole 200 by a force (the predetermined force) that is less than the threshold force to prevent the cable 150 and/or pole 200 from being damaged. The threshold force can be a function of the type of pole 200, the type of materials used to manufacture the pole 200, the type and size of cable 150, and/or the location of the pole 200 and cable 150 (e.g., it may be less desirable to have the cable 150 detach from the pole 200 at locations near roads, homes, etc.). Furthermore, the threshold force can be adjusted based on the condition of the pole 200 and/or cable 150. For example, if the pole 200 to which the breakaway cable attachment system 100 is to be attached has reduced strength due to deterioration or damage, the threshold force can be less than when the pole 200 was new and the predetermined force can be adjusted accordingly. In other words, the threshold force can be selected to factor in at least the mechanical properties, location, and condition of the pole 200. The breakaway cable attachment system 100 can be configured to detach the cable 150 from the pole 200 under a predetermined force that is approximately 95% of the threshold force. In other examples, the predetermined force can be approximately between 40% and 99% of the threshold force, approximately between 50% and 90% of the threshold force, approximately between 55% and 80% of the threshold force, approximately between 60% and 70% of the threshold force, or approximately between 60% and 65% of the threshold force. As will be appreciated, the predetermined force can be different depending on the particular configuration.

Further, as will be appreciated, the exact threshold force for cables 150 and/or poles 200 will vary even among cables 150 and poles 200 of the same material and size. This can be due, for example, to manufacturing defects, manufacturing tolerances, conditions of the cables 150 and poles 200, etc. Thus, a threshold force for a given cable 150 and pole 200 can be estimated based on the type of cable 150 and pole 200. Thus, the breakaway cable attachment system 100 can be designed to detach the cable 150 from the pole 200 at a predetermined force that is less than the estimated threshold force of the cable 150 and/or pole 200. The threshold force can be determined based on the lowest force necessary to cause damage to the cable 150, the pole 200, or to other components of the utility line. For example, if the cable 150 has a rated breaking strength of 10,000 pounds (lbs) and the pole 200 has a rated breaking strength of 15,000 lbs., the predetermined force can be based on the lower of the force required to damage the cable 150 or the pole 200 (in this case, it would be the cable 150). As another example, if it is known that the cable 150 has an elastic limit of 8,000 lbs., the predetermined force can be less than 8,000 lbs. to ensure the cable 150 detaches from the pole 200 prior to the yield point of the cable 150. Furthermore, if the cable 150 is attached with fittings or hardware that are known to break at a lower threshold force, the predetermined force can be based on that lower threshold force to ensure no damage is done to the cable 150, the pole 200, or the other components. In other examples, the threshold force can be based on a maximum allowable design tension. For example, some fiber-optic cables are designed with maximum allowable design tensions. In this case, the predetermined force can be lower than the maximum allowable design tension (threshold force).

Figure 2D:
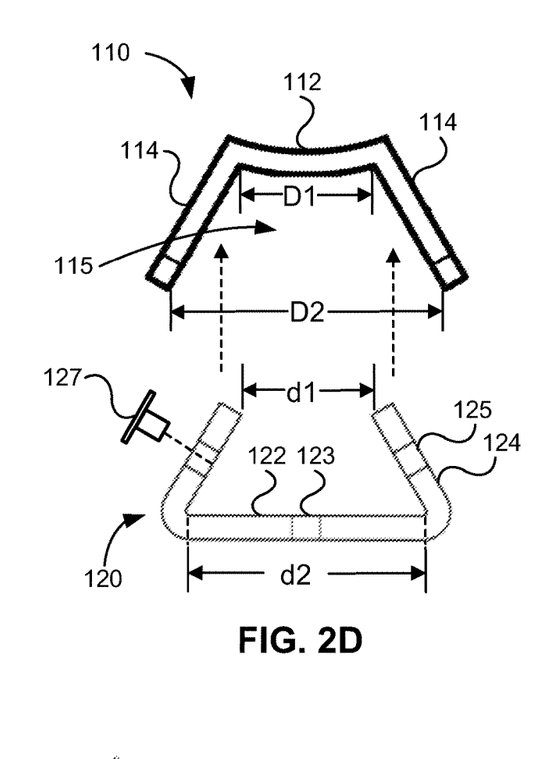
FIG. 2D illustrates a top view of a rail and a bracket, in accordance with an example of the disclosed technology.

The breakaway cable attachment system 100 can be attached to the pole 200 using one or more fasteners 102. The fasteners 102, for example and not limitation, can include a nut, washer, and bolt assembly that can extend through the pole 200. The rail 110 can include one or more mounting holes 111 that can extend through a base 112 of the rail 110 and through which the fasteners 102 can extend. The base 112 can be a portion of the rail 110 that is disposed against or proximate the pole 200 when the breakaway cable attachment system 100 is attached to the pole 200. The base 112 can be configured to conform to the pole 200 by having a curved profile (as illustrated in FIGS. 2C and 2D).

The base 112 can be positioned between two sidewalls 114 that can be attached to the base 112. As illustrated in FIGS. 2C and 2D, the sidewalls 114 can extend outwardly from the base 112 at an angle and can form a slot 115 between the sidewalls 114 for receiving the bracket 120. For example, as illustrated in FIG. 2D, the sidewalls 114 can extend outwardly from the base 112 of the rail 110 at an angle such that a distance D1 between the sidewalls 114 proximate the base 112 is less than a distance D2 between the sidewalls 114 distal the base 112. Stated otherwise, a distance D2 between the sidewalls 114 distal the base 112 can be greater than a distance D1 between the sidewalls proximate the base 112. Because the sidewalls 114 extend outwardly from the base 112 at an angle, the rail 110 can be configured to receive the bracket 120 without the bracket 120 binding with the rail 110. This not only makes installation of the bracket 120 with the rail 110 easier, but the angled sidewalls 114 also help to reduce the likelihood of the bracket 120 binding within the rail 110 when a predetermined force is applied to the cable 150.

The rail 110 can further include one or more bracket mount holes 116 that can extend through the sidewalls 114 (as illustrated in FIGS. 2A and 2B). The bracket mount holes 116 can be spaced along the sidewalls 114 at a predetermined distance such that one or more brackets 120 can be mounted to the rail 110 at a suitable distance to provide sufficient separation between cables attached to the breakaway cable attachment system 100.

Figure 7:
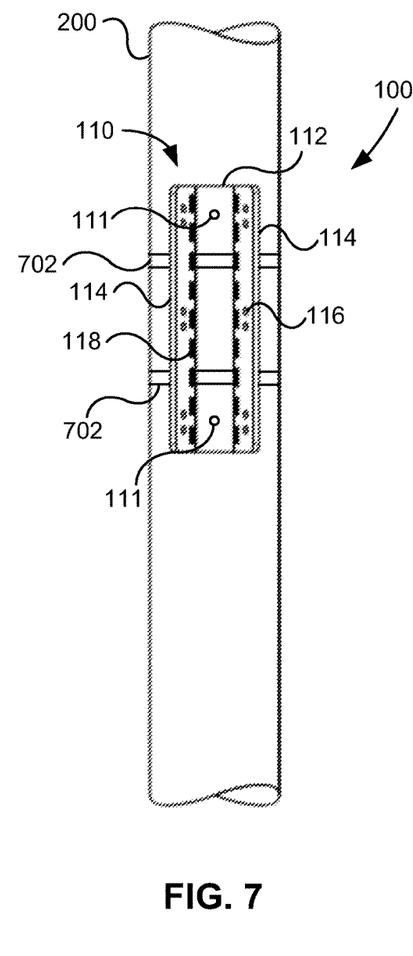
FIG. 7 illustrates a front view of a breakaway cable attachment system, in accordance with another example of the disclosed technology.

The rail 110 can further include one or more slits 118 formed in a side of the sidewalls 114 that can be sized to receive a strap 702 (as illustrated in FIG. 7—sometimes referred to as a band). The slits 118 can enable the breakaway cable attachment system 100 to be quickly or temporarily installed using straps 702 rather than requiring fasteners 102 to be installed through the pole 200. For example, if the pole 200 does not have any holes drilled through the pole 200 at the desired mounting location, the breakaway cable attachment system 100 can be mounted to the pole 200 using the straps 702 to help reduce the amount of time required for installation. The straps 702 can be any suitable strap or band for the application. For example, the straps 702 can be made from fiber material or metal and can include a seal, a buckle, a clamp, a knot, a bolt, a pin, or any other suitable fastening system or method for the application.

Figures 3, 4A, 4B:
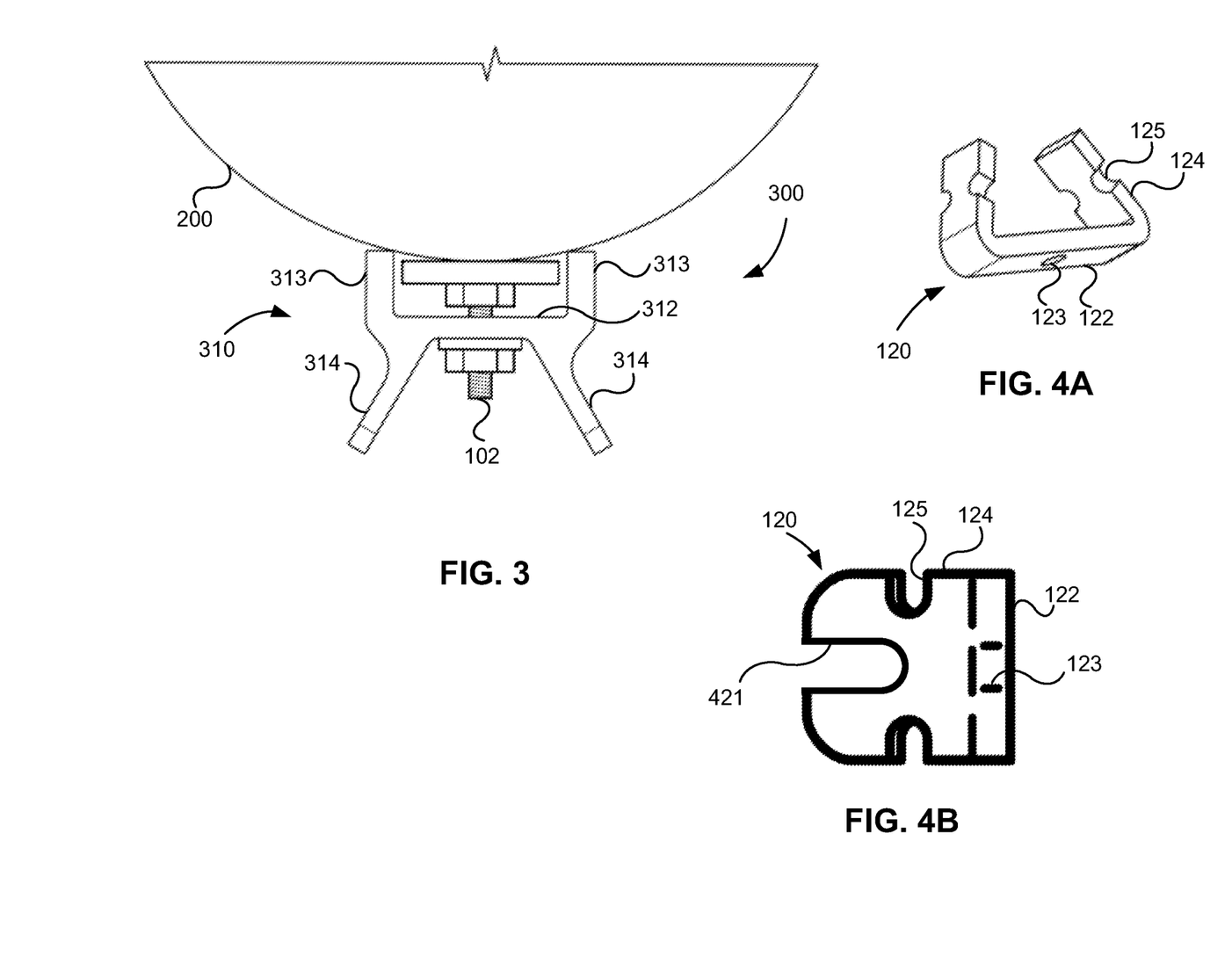
FIG. 3 illustrates a top view of a rail of a breakaway cable attachment system, in accordance with another example of the disclosed technology.
FIG. 4A illustrates a perspective view of a bracket, in accordance with an example of the disclosed technology.
FIG. 4B illustrates a side view of a bracket, in accordance with another example of the disclosed technology.

The bracket 120 can be attached to the rail 110 using one or more fasteners 126 as illustrated in FIG. 2C. The fasteners 126 can extend through the bracket mount holes 116 of the rail 110 and extend through a mount notch 125 formed in the bracket 120 (as illustrated in FIGS. 2D, 4A and 4B). Although the bracket 120 is illustrated as having notches 125 rather than holes formed through the bracket 120, it will be appreciated that the bracket 120 can have holes extending through the bracket 120 to receive the fasteners 126. Furthermore, although the bracket 120 is shown as being attached to the rail 110 using four fasteners 126 (two on each side) it will be appreciated that the bracket 120 can be attached to the rail 110 using a single fastener 126 on either side or more than two fasteners 126 on either side. As illustrated in FIG. 4B, the bracket 120 can optionally include a relief slot 421 that can be configured to facilitate the bracket 120 detaching from the rail 110 when a predetermined load is applied to the cable 150 and/or the pole 200. The relief slot 421, for example, can be sized or configured to help ensure the bracket 120 deforms to detach the bracket 120 from the rail 110 for a predetermined force. For example, the slot 421 can be enlarged for low loads and reduced in size or otherwise eliminated for greater loads.

Returning now to FIG. 2D, in some examples the disclosed technology can include a flanged sleeve 127 that can be inserted into the mount notch 125 or holes and the fasteners 126 can extend through the flanged sleeve 127 to attach the bracket 120 to the rail 110. As will be appreciated, the flanged sleeve 127 can be made from a polymer material to help isolate the cable 150 from the pole 200. For example, the flanged sleeve 127 can help electrically isolate the cable 150 from the pole 200 and can help to reduce the effects of excessive vibrations or over-tensioned bolts, and/or prevent binding during a breakaway event. The flanged sleeve 127 can also be made from materials other than polymer material such as metals, composite materials, and/or ceramic materials. Furthermore, as will be appreciated, the bracket 120 can be attached to the rail 110 using other attachment methods or devices such as a weld, an adhesive, a cable, a rivet, a clamp, a clip, a pin, a dowel, or any other suitable attachment method or device as would be suitable for the particular application.

As illustrated in FIG. 2D, the bracket 120 can have an attachment portion 122 and one or more mounting portions 124. The attachment portion 122 can have one or more mounting holes 123 configured to receive a fastener 139 to fasten the clamp 130 to the bracket 120. Furthermore, the one or more mounting portions 124 can extend outwardly from the attachment portion 122 at an angle that can be configured to conform to the angle at which the sidewalls 114 extend outwardly from the base 112 of the rail 110. In other words, the bracket 120 can be configured to fit at least partially in the slot 115 formed by the sidewalls 114 of the rail 110 and the mounting portions 124 can align and/or come in contact with the sidewalls 114.

The mounting portions 124 can extend outwardly from the attachment portion 122 such that a distance d1 between the mounting portions 124 distal the attachment portion 122 can be less than a distance d2 between the mounting portions 124 proximate the attachment portion 122. Stated otherwise, the mounting portions 124 can extend outwardly from the attachment portion 122 such that a distance d2 between the mounting portions 124 proximate the attachment portion 122 can be greater than a distance d1 between the mounting portions 124 distal the attachment portion 122. In this way, the bracket 120 can be configured to align with, and be easily attached to, the rail 110 without binding.

Figures 5A, 5B:
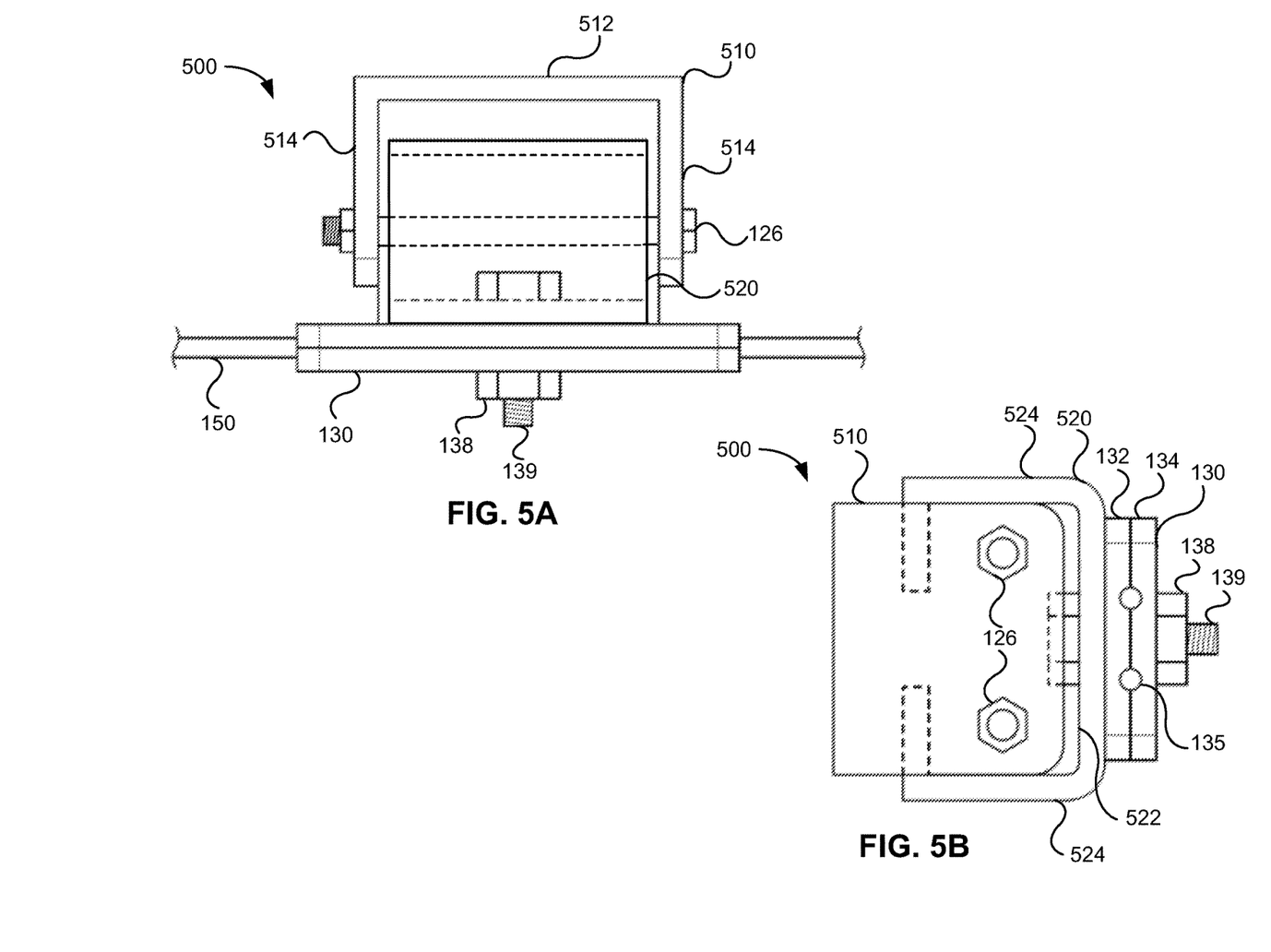
FIG. 5A illustrates a top view of a breakaway cable attachment system, in accordance with another example of the disclosed technology.
FIG. 5B illustrates a side view of a breakaway cable attachment system, in accordance with another example of the disclosed technology.

The clamp 130 can be attached to the bracket 120 using one or more fasteners 139 as previously described. The clamp 130 can be configured to receive and support a cable 150. The clamp 130, as a non-limiting example, can be a messenger cable clamp 130. The clamp 130 can include a first portion 132 and a second portion 134 that can form a recess 135 therebetween to receive and support the cable 150 (as best illustrated in FIG. 5B). The first portion 132 and the second portion 134 can be sized to form a recess 135 that is configured to receive and support a cable 150 having a predetermined size. For example, the first portion 132 and the second portion 134 can form a larger recess 135 therebetween for large cables 150 and a smaller recess 135 therebetween for smaller cables 150.

As described previously, the breakaway cable attachment system 100 can be configured to detach the cable 150 from the pole 200 when a predetermined force is applied to the cable 150. To enable the breakaway cable attachment system 100 to detach the cable 150 from the pole 200, the clamp 130 can include a spring-loaded washer 136 that can be configured to deform when the predetermined force is applied. For example, the spring-loaded washer 136 can be a conical spring washer (sometimes referred to as a Belleville washer) that is configured to deform and permit the clamp 130 to open when the predetermined force is applied to the cable 150. In other words, when an object falls on the cable 150 and the predetermined force is transferred to the clamp 130 via the cable 150, the spring-loaded washer 136 can deform and permit the clamp 130 to open such that the cable 150 will detach from the pole 200. Although described as including a spring-loaded washer 136, one of skill in the art will appreciate that the clamp 130 can include a spring or other similar component that can be configured to deform when the predetermined force is applied to the cable 150 to enable the cable 150 to detach from the pole 200. Furthermore, although illustrated as including a single spring-loaded washer 136 positioned between the clamp 130 and a nut 138, one of skill in the art will appreciate that the breakaway cable attachment system 100 can include multiple spring-loaded washers 136 as suitable for the particular application.

Alternatively, or in addition, the breakaway cable attachment system 100 can be configured to detach the cable 150 from the pole 200 by detaching the rail 110 from the pole 200, detaching the bracket 120 from the rail 110, and/or detaching the clamp 130 from the bracket 120. For example, any of the fasteners described herein (i.e., fasteners 102, fasteners 126, fastener 139) can be a shear bolt that is configured to break when the predetermined force is applied to the cable. To illustrate, the fasteners 102 can be shear bolts and be configured to break when the predetermined force is applied to the cable 150 such that the entire breakaway cable attachment system 100 detaches from the pole 200. Similarly, the fasteners 126 can be shear bolts and be configured to break when the predetermined force is applied to the cable 150 such that the bracket 120 can break away from the rail 110. Furthermore, the fastener 139 can be a shear bolt and be configured to break when the predetermined force is applied to the cable 150 such that the clamp 130 can break away from the bracket 120. Depending on the configuration, one, some, or all of the fasteners described herein (i.e., fasteners 102, fasteners 129, fastener 139) can be shear bolts configured to break when the predetermined force is applied to the cable 150.

Although shown and described herein as being separate components, it will be appreciated that some of the components of the breakaway cable attachment system 100 can be integrated to form a single component. For example, the bracket 120 and the clamp 130 can be combined to form a single component. Similarly, the rail 110 and the bracket 120 can be combined to form a single component. Further, the rail 110, the bracket 120, and the clamp 130 can be combined to form a single component comprising features of all three components.

FIG. 3 illustrates a top view of a rail 310 of a breakaway cable attachment system 300, in accordance with another example of the disclosed technology. The breakaway cable attachment system 300 can include each of the same components previously described herein except that the rail 110 can be replaced with the rail 310. For the sake of simplicity, the breakaway cable attachment system 300 is shown with only the rail 310 being attached to the pole 200. The rail 310 can include a base 312 and two sidewalls 314 extending outwardly from the base 312 at an angle, similar to the rail 110. Unlike the rail 110 which has a curved base 112 that conforms to the pole 200, the rail 310 can include two feet 313 which extend between the base 312 and the pole 200. The feet 313 can help to offset the base 312 from the pole 200 to form a space between the base 312 and the pole 200. In this way, the rail 310 can be configured to be mounted over a nut, washer, or other components of the fastener 102. Furthermore, only the portion of the fastener 102 which supports the rail 310 can include the shear location of the shear bolt and, therefore, the fastener 102 can continue to support other components that may be supported by the same fastener 102 if the rail 310 happens to break away from the pole 200 when the predetermined load is applied.

FIG. 5A illustrates a top view of a breakaway cable attachment system 500 while FIG. illustrates a side view of the breakaway cable attachment system 500, in accordance with another example of the disclosed technology. For simplicity, the breakaway cable attachment system 500 is shown without the pole 200, but it will be appreciated that the breakaway cable attachment system 500 can be attached to the pole 200 similar to the breakaway cable attachment system 100. For example, a fastener (i.e., fastener 102) can extend through the pole 200 and the base 512 of the rail 510.

The breakaway cable attachment system 500 can include each of the same basic components previously described in relation to the breakaway cable attachment system 100, namely, a rail 510, a bracket 520, and a clamp 130. Rather than being fastened directly to the rail 510, however, the bracket 520 can be configured to engage or interlock with fasteners 126 extending between the sidewalls 514 of the rail 510. For example, as illustrated in FIG. 5B, the bracket 520 can include an attachment portion 522 and two mounting portions 524 that extend outwardly away from the attachment portion 522 but also engage or interlock with the fasteners 126. In this way, the bracket 520 will remain attached to the rail 510 unless a sufficient force causes the mounting portions 524 to deform and bend, causing the bracket 520 to become detached from the rail 510 (and, consequently the cable 150 to be detached from the pole 200). To illustrate, the mounting portions 524 can be configured to prevent the bracket 520 from detaching from the rail 510 unless the predetermined force is exceeded. Once the predetermined force is exceeded, the mounting portions 524 can deform and allow the bracket 520 to detach from the rail 510.

Although illustrated as having substantially straight sidewalls 514, the rail 510 can have angled sidewalls 514 similar to the sidewalls 114 previously described. Similarly, although shown as having mounting portions 524 that having substantially straight sides, the mounting portions 524 can have sloped edges that can conform to the angle formed by the sidewalls 514 if the sidewalls 514 are formed at an angle in relation to the base 512.

Figure 6:
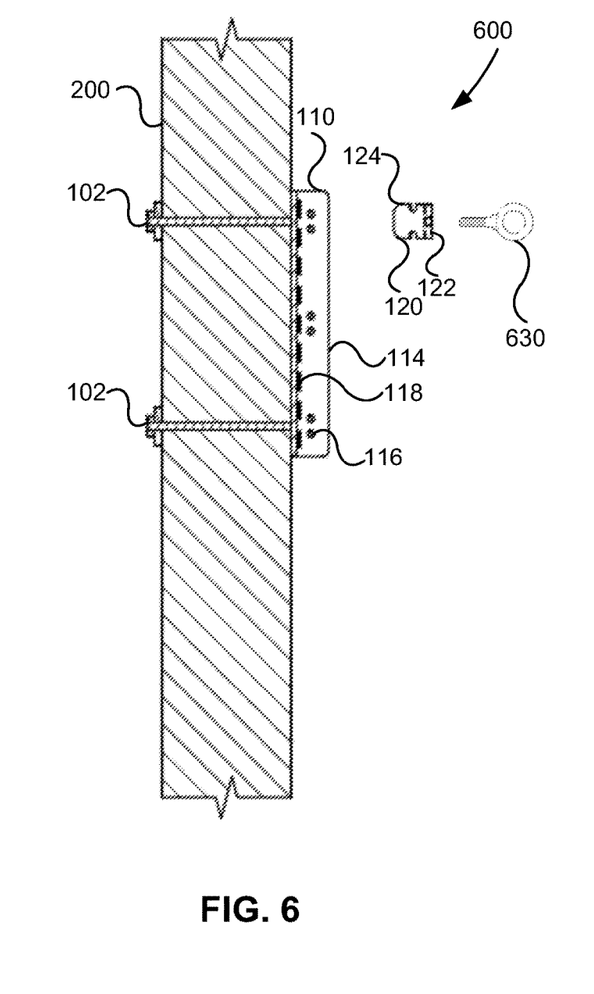
FIG. 6 illustrates a section view of a utility pole and rail taken along line A-A of FIG. 2A and other components of the breakaway cable attachment system shown in an exploded configuration, in accordance with another example of the disclosed technology.

FIG. 6 illustrates a section view of a utility pole 200 and rail 110 taken along line A-A of FIG. 2A and other components of a breakaway cable attachment system 600 shown in an exploded configuration, in accordance with another example of the disclosed technology. The breakaway cable attachment system 600 can include each of the same components shown and described in relation to the breakaway cable attachment system 100 except that the breakaway cable attachment system 600 can include an eyebolt 630 rather than a clamp 130. The breakaway cable attachment system 600 can be used, for example, at the end of a line of poles 200 in a location where the cable 150 turns a corner or is terminated (e.g., when matching the turn in a distribution line, transitioning from overhead to underground cable, etc.). The cable 150 can be run through the eye of the eyebolt 630 and permitted to turn by bending at the eyebolt 630. As will be appreciated, some cables 150 require a minimum bend radius and, therefore, the eyebolt 630 can be replace with curved brackets, an additional messenger cable clamp suspended from the eyebolt, pulleys, or other similar devices configured to help ensure the cable 150 does not exceed its minimum bend radius. Although described and illustrated as an eyebolt 630, one of skill in the art will appreciate that the eyebolt 630 may be interchanged with other types of connections such as an eyenut, an eyelet, etc. which may also include a fastener 139, a nut 138, or other similar component(s).

As will be appreciated, the breakaway cable attachment system 600 can be configured to facilitate the cable 150 breaking away from the pole 200 using shear bolts (i.e., fasteners 102, fasteners 126, fastener 139, and/or the eyebolt 630 can be a shear bolt) or by including the bracket 120, or bracket 520 previously described. In this way, the breakaway cable attachment system 600 can be configured to detach the cable 150 from the pole 200 when the predetermined force is applied to the cable 150 to help reduce damage that could occur to the cable 150 and/or the pole 200.

As briefly described above, FIG. 7 illustrates a front view of a breakaway cable attachment system 100 having straps 702 used to attach the breakaway cable attachment system 100 to the pole 200 in place of, or in addition to, the fasteners 102. As will be appreciated, by using straps 702, the breakaway cable attachment system 100 can be configured for quick attachment to a pole 200 and does not require holes to be drilled through the pole 200 as is the case with the fasteners 102. This can be particularly useful, for example, when installing new cables, cables 150 intended to be installed on the poles 200 temporarily, or cables 150 on poles where drilling new or additional holes would be restricted or prohibited, such as concrete poles.

Although described throughout this disclosure as a breakaway cable attachment system, it will also be appreciated that the disclosed technology can be configured such that the cable 150 is unlikely to break away from the pole 200 when a force is applied to the cable 150 or the pole 200. This can be particularly useful, for example, in locations where it is undesirable for the cable 150 to detach from the pole 200 such as at road crossings or other locations where a detached cable 150 could become a hazard. As an example, rather than having fasteners or a bracket configured to detach the cable 150 from the pole 200 when a predetermined force is applied, the disclosed technology can be configured simply to attach the cable 150 to the pole 200. Furthermore, as described above, the disclosed technology can be configured to ensure the proper spacing between cables 150 is maintained when mounted to the pole 200. As will be appreciated by one of skill in the art, the disclosed technology can provide significant advantage over existing attachment systems even if the disclosed technology is not configured to detach the cable 150 from the pole 200 when a force is applied. For example, the disclosed technology can provide for a simplified process of attaching a cable 150 to the pole 200 when compared to existing technology.

While the present disclosure has been described in connection with a plurality of exemplary aspects, as illustrated in the various figures and discussed above, it is understood that other similar aspects can be used, or modifications and additions can be made to the described subject matter for performing the same function of the present disclosure without deviating therefrom. In this disclosure, methods and compositions were described according to aspects of the presently disclosed subject matter. But other equivalent methods or compositions to these described aspects are also contemplated by the teachings herein. Therefore, the present disclosure should not be limited to any single aspect, but rather construed in breadth and scope in accordance with the appended claims.

What is claimed is:

1. A breakaway cable attachment system comprising:
   a rail configured for attachment to a utility pole, the rail having a base and two sidewalls extending outwardly from the base forming a slot extending longitudinally along a length of the rail;
   a bracket having an attachment portion and a mounting portion extending at an angle away from the attachment portion, the mounting portion configured to extend at least partially into the slot of the rail for attachment to the rail; and
   a clamp configured for attachment to the attachment portion of the bracket, the clamp configured to receive and support a cable,
   wherein the clamp comprises a spring configured to deform when a predetermined load is applied to the cable such that the clamp is opened to release the cable to detach from the utility pole when the predetermined load is applied to the cable.

2. The breakaway cable attachment system of claim 1, wherein a distance between the sidewalls of the rail is greater distal the base than proximate the base.

3. The breakaway cable attachment system of claim 2, wherein the mounting portion is a first mounting portion and the bracket further comprises a second mounting portion, and
   wherein a distance between the first mounting portion and the second mounting portion is greater proximate the attachment portion than distal the attachment portion.

4. The breakaway cable attachment system of claim 1, wherein the spring is a spring-loaded washer.

5. The breakaway cable attachment system of claim 1, wherein the bracket is a first bracket, the clamp is a first clamp, and the cable is a first cable, the breakaway cable attachment system further comprising:
   a second bracket having an attachment portion and a mounting portion extending at an angle away from the attachment portion, the mounting portion configured to extend at least partially into the slot of the rail for attachment to the rail; and
   a second clamp configured for attachment to the attachment portion of the bracket, the clamp configured to receive and support a second cable,
   wherein the second bracket is attached to the rail a predetermined distance away from the first bracket such that the first cable and the second cable are spaced apart from each other.

6. The breakaway cable attachment system of claim 1, wherein the rail is attached to the utility pole by a shear bolt configured to break when the predetermined load is applied to the cable.

7. The breakaway cable attachment system of claim 1, wherein the bracket is attached to the rail by a shear bolt configured to break when the predetermined load is applied to the cable.

8. The breakaway cable attachment system of claim 1, wherein the clamp is attached to the bracket by a shear bolt configured to break when the predetermined load is applied to the cable.

9. The breakaway cable attachment system of claim 1, wherein the mounting portion of the bracket extends at least partially around a bolt extending into the slot of the rail, and
   wherein the mounting portion is configured to detach from the rail when the predetermined load is applied to the cable.

10. The breakaway cable attachment system of claim 1, wherein the rail is configured to be bolted to the utility pole.

11. The breakaway cable attachment system of claim 1, wherein the rail defines a slit configured to receive a strap, and
    wherein the breakaway cable attachment system further comprises a strap configured to extend through the slit of the rail to attach the breakaway cable attachment system to the utility pole.

12. The breakaway cable attachment system of claim 1, wherein the mounting portion further defines a notch, the notch configured to at least partially receive a bolt extending through the rail.

13. The breakaway cable attachment system of claim 1, wherein the mounting portion further defines a relief slot, the relief slot being sized based on a predetermined load to permit the bracket to deform and detach from the rail when the predetermined load is applied.

14. The breakaway cable attachment system of claim 1 further comprising an insulated sleeve positioned between the bracket and the rail, the insulated sleeve comprising a flange extending outwardly and positioned to electrically insulate the bracket from the rail.

15. A cable attachment system comprising:
    a rail configured for attachment to a utility pole, the rail having a base and first and second sidewalls extending outwardly from the base forming a slot extending longitudinally along a length of the rail, the first and second sidewalls extending outwardly at an angle such that a distance between the first and second sidewalls is greater distal the base than proximate the base;
    a bracket having an attachment portion and first and second mounting portions extending outwardly from the attachment portion and configured to extend at least partially into the slot of the rail, the first and second mounting portions extending outwardly at an angle such that a distance between the first mounting portion and the second mounting portion is greater proximate the attachment portion than distal the attachment portion; and a clamp configured for attachment to the attachment portion of the bracket, the clamp configured to receive and support a cable and comprising a spring-loaded washer configured to deform when a predetermined load is applied to the cable such that the clamp can be opened to release the cable, wherein the cable attachment system is configured to detach the cable from the utility pole when the predetermined load is applied to the cable.

16. The cable attachment system of claim 15, wherein the first and second mounting portions each respectively further define a relief slot, the relief slot being sized based on a predetermined load to permit the bracket to deform and detach from the rail when the predetermined load is applied.

17. The cable attachment system of claim 16, wherein the first and second mounting portions each respectively further define a notch, the notch configured to at least partially receive a bolt extending through the rail.

18. The cable attachment system of claim 17 further comprising an insulated sleeve positioned between the bracket and the rail, the insulated sleeve comprising a flange extending outwardly and positioned to electrically insulate the bracket from the rail.

\* \* \* \* \*